May 4, 1926.

C. A. BORNMANN 1,583,116

AUTOMATIC FILM WINDING CAMERA

Filed Jan. 12, 1925

INVENTOR
CARL A. BORNMANN,
BY
*Philip S. Hopkins*
ATTORNEY

Patented May 4, 1926.

1,583,116

UNITED STATES PATENT OFFICE.

CARL A. BORNMANN, OF BINGHAMTON, NEW YORK, ASSIGNOR TO ANSCO PHOTO-PRODUCTS, INC., OF BINGHAMTON, NEW YORK.

AUTOMATIC FILM-WINDING CAMERA.

Application filed January 12, 1925. Serial No. 1,768.

*To all whom it may concern:*

Be it known that I, CARL A. BORNMANN, a citizen of the United States, and a resident of the city of Binghamton, county of Broome, and State of New York, have invented certain new and useful Improvements in an Automatic Film-Winding Camera, of which the following is a description, reference being had to the accompanying drawing, which forms a part of this specification.

This invention relates generally to cameras and is particularly directed to that type of roll film camera having power means for automatically winding up the exposed portion of the film and bringing a new unexposed portion into proper position. This winding mechanism is usually and preferably controlled by the operation of the shutter and adapted to be actuated immediately after shutter has been operated to make an exposure.

The primary object of my invention is to provide a new control for the film winding mechanism which is simple in construction, positive in operation and of few parts, thereby simplifying the assembly of the camera.

Another object is to so contruct and arrange the various parts of the winding and controlling mechanisms of the camera to obtain highest degree of efficiency and accuracy therefrom with the use of the least amount of labor, material and space possible.

A further object is to provide a winding mechanism the operation of which is exceptionally silent and smooth.

More specifically, it is an object to provide a new type of governor or speed controlling device for the winding mechanism, which while effectively regulating the speed of the mechanism, is silent in operation and requires a minimum amount of power from the driving source to operate.

Another object and advantage in details of construction and operation will be apparent as the description proceeds reference being had to the accompanying drawings wherein like reference numerals indicate like parts.

Figures 1, 2:
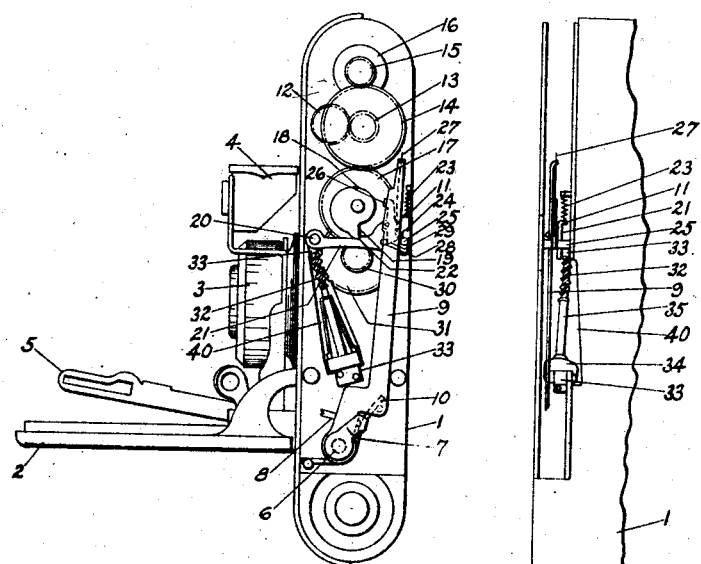
Figure 1 is a side view of my improved camera, the cover or top being removed therefrom to illustrate the assembled parts.
Figure 2 is a broken edge view of my new control mechanism.

I have illustrated an adaptation of my invention to a folding camera indicated generally by the reference numeral 1. This camera is provided with the usual platform 2, lens and shutter 3, view finder 4, and operating lever 5.

The operating lever 5 is designed for connection with the shutter operating means (not shown) when the front of the camera, including the shutter 3 is extended upon the platform 2. The opposite end of the lever 5 is secured to the shaft 6, running through the body of the camera and carrying at its opposite end an arm 7. This arm 7 engages with an adjusting screw 8, carried by the controlling lever 9, which is normally forced to the right in Figure 1 by means of a coil spring 10. The upper end of the operating lever 9 carries a pawl 11 for a purpose to be described.

The numeral 12 indicates a pinion which is normally under tension to rotate by means of a spring motor or other source of power (not shown) provided in the camera for driving the winding mechanism. This pinion 12 meshes with the pinion 13, carrying gear 14 which in turn meshes with and drives gear 15 having operative engagement with the take up spool 16.

Gear 14 also meshes with a gear 17 carrying a stop element 18 provided with a shouldered nose 19. Pivoted at 20 is a lever 21 provided intermediate its ends with a shoulder 22 adapted to engage with shoulder 19. A coil spring 23 normally pulls the lever upwardly bringing the shoulder 22 in the path of and for engagement with the shoulder 19 of the stop element. The free end of the lever 21 is bifurcated as at 24 and a guide pin 25 is positioned within said bifurcated end for guiding and limiting the movement of the lever.

The pawl 11 pivoted near the upper end of controlling lever 9 is provided with an ear 26 adapted to engage with the inner edge of the lever 9, thus permitting the pawl 11 movement in one direction only against the tension of the leaf spring 27. A pin 28 carried by the lever 21 lies in the path of the lower end of pawl 11. Said lower end has a bevelled shoulder 29 for a purpose to be described.

In the operation of the parts so far mentioned, it should be understood that upon the operation of the shutter mechanism, the operating lever 5 is depressed rotating shaft 6 which in turn forces the arm 7 to the left in Fig. 1, thus moving the lever 9 to the left on its pivot against the action of spring 10. Upon such movement of the lever 9 to the left, the pawl 11 engages with pin 28 and being free to rock on its pivot, in this direction idles over said pin. Upon the return movement of the lever 9 to the right (after the exposure has been made and due to the action of spring 10 which is permitted to exert its tension upon the release of shutter mechanism), the bevelled shoulder 29 of the pawl 11 engages with the pin 28 and being unable to yield in this direction because of the ear 26, the pawl 11 forces the lever 21 downwardly, thus disengaging the shoulder 22 from the stop element at which time the motor driven pinion 12 is free to rotate the gear train and drive the pinion 15 for winding the film. Of course upon the complete return to the right of lever 9, carrying the pawl 11 past the pin 28, the lever 21 is permitted to return to its normal position shown in Figure 1 where the shoulder 22 is again in the path of the shoulder 19 of the stop element where upon one revolution of said stop element, the motion of the winding mechanism will again be arrested. The ratio of the winding mechanism to the film spool 16 is such that one complete revolution of gear 17 carrying the stop element results in winding one full exposure length of film on to the take up spool.

The parts so far described have not been shown in detail and for the exact construction and operation thereof, reference may be had to Patents No. 1,513,268, October 28, 1924, John B. Pawley, and 1,197,901, September 12, 1916, Carl A. Bornmann et al. These patents clearly show and describe lever 5, shaft 6, controlling lever 9, pawl 11, spring motor and driving mechanism 12, and shutter operating mechanism. Inasmuch as these parts are identical as those shown in the patents, it has not been deemed necessary either to illustrate or describe the same in further detail here.

Figures 3, 4:
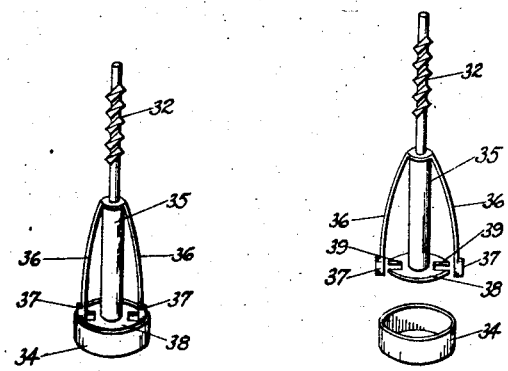
Figures 3 and 4 are details of the governor or speed controlling device.

Referring again to Figure 1, it will be noted that the gear 17 drives a pinion 30, carrying a worm gear 31. This worm gear meshes with and drives a worm shaft 32 provided at either end with suitable bearings 33, the lower one of which is provided with a circular housing 34. Carried by the worm shaft 32 for rotation therewith is a sleeve 35 provided with two depending spring arms 36 carrying weights or brushes 37 at their lower ends. A disc 38 is secured to the lower end of the shaft, and is notched as at 39 to receive the weighted ends 37. As shown in Figure 3, the disc 38 together with the weighted ends 37 of the spring arms 36 are assembled within the housing 34.

The operation of these parts will be readily understood for upon rotation of the winding mechanism as heretofore described, the shaft 32 will be rotated by the worm gear 31 and upon such rotation the ends 37 of the spring arms 36 will, due to the centrifugal action, have a tendency to spread outwardly against the inner wall of the housing 34. This forms a very effective, silent and smooth running governor or speed controlling device for the winding mechanism and eliminates any possibility of the gear train running faster than is practical in a camera of this type.

The body of the camera has been recessed as at 40 to accommodate the governor without enlarging the camera in any way nor distorting its outward appearance.

As it is believed the foregoing clearly describes the operation of my invention, no repetition of the same is necessary here.

Of course my invention is susceptible to various changes in details of construction and operation without departing from the spirit and scope thereof. I do not limit myself therefore to the exact construction shown other than by the appended claim.

I claim:

A centrifugal governor comprising a rotatable shaft, a sleeve rigid with said shaft, carrying weighted spring arms, a housing for the free ends of said spring arms, and a notched disk on said sleeve and fitting within said housing to guide said arms laterally against the side walls of said housing.

CARL A. BORNMANN.